(12) United States Patent
Tang et al.

(10) Patent No.: US 8,450,644 B2
(45) Date of Patent: May 28, 2013

(54) MULTI-MODE ULTRASONIC WELDING CONTROL AND OPTIMIZATION

(75) Inventors: Jason C. H. Tang, Sterling Heights, MI (US); Wayne W. Cai, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 13/039,979

(22) Filed: Mar. 3, 2011

(65) Prior Publication Data

US 2012/0226373 A1 Sep. 6, 2012

(51) Int. Cl.
| | |
|---|---|
| B23K 9/12 | (2006.01) |
| B23K 15/00 | (2006.01) |
| B23K 11/10 | (2006.01) |
| B23K 31/02 | (2006.01) |
| B23K 20/08 | (2006.01) |
| B23K 1/06 | (2006.01) |

(52) U.S. Cl.
USPC . 219/124.1; 219/61.5; 219/91.1; 219/121.13; 219/121.14; 228/102; 228/108; 228/109; 228/110.1; 156/73.5; 156/73.6

(58) Field of Classification Search
USPC ..... 700/212; 702/56; 703/7–8; 228/101–102; 228/108–109, 110.1; 156/73.1, 73.5–73.6; 219/617, 121.13–121.14, 61.5, 91.1, 124.1; 429/160–161
See application file for complete search history.

(56) References Cited

U.S. PATENT DOCUMENTS

| | | | | |
|---|---|---|---|---|
| 4,326,155 | A * | 4/1982 | Griebeler | 318/576 |
| 4,485,387 | A * | 11/1984 | Drumheller | 346/140.1 |
| 4,811,887 | A * | 3/1989 | King et al. | 228/2.3 |
| 4,842,671 | A * | 6/1989 | Nuss | 156/433 |
| 4,844,320 | A * | 7/1989 | Stokes et al. | 228/102 |
| 5,110,381 | A * | 5/1992 | Heckard et al. | 156/64 |
| 5,386,092 | A * | 1/1995 | Dufrenne | 219/86.32 |
| 6,087,036 | A * | 7/2000 | Rouillard et al. | 429/66 |
| 6,588,646 | B2 * | 7/2003 | Loprire | 228/110.1 |
| 7,810,699 | B1 * | 10/2010 | Cai et al. | 228/102 |
| 8,011,559 | B2 * | 9/2011 | Cai et al. | 228/110.1 |
| 8,032,343 | B2 * | 10/2011 | Cai et al. | 703/7 |
| 8,114,242 | B2 * | 2/2012 | Cai et al. | 156/295 |
| 2004/0178249 | A1 | 9/2004 | Gordon, Jr. | |
| 2004/0216829 | A1 * | 11/2004 | Gordon, Jr. | 156/64 |
| 2005/0145306 | A1 * | 7/2005 | Statnikov | 148/508 |
| 2010/0023150 | A1 * | 1/2010 | Cai et al. | 700/103 |
| 2010/0270358 | A1 * | 10/2010 | Cai et al. | 228/102 |
| 2010/0294420 | A1 * | 11/2010 | Cai et al. | 156/91 |
| 2011/0108181 | A1 * | 5/2011 | Cai et al. | 156/64 |
| 2011/0108184 | A1 * | 5/2011 | Cai et al. | 156/73.5 |
| 2011/0186204 | A1 * | 8/2011 | Cai et al. | 156/73.1 |
| 2011/0186616 | A1 * | 8/2011 | Cai et al. | 228/110.1 |
| 2012/0000964 | A1 * | 1/2012 | Sigler et al. | 228/111.5 |
| 2012/0006810 | A1 * | 1/2012 | Fan et al. | 219/617 |

* cited by examiner

*Primary Examiner* — Ramesh Patel
(74) *Attorney, Agent, or Firm* — John A. Miller; Miller IP Group, PLC

(57) ABSTRACT

A system and method for providing multi-mode control of an ultrasonic welding system. In one embodiment, the control modes include the energy of the weld, the time of the welding process and the compression displacement of the parts being welded during the welding process. The method includes providing thresholds for each of the modes, and terminating the welding process after the threshold for each mode has been reached, the threshold for more than one mode has been reached or the threshold for one of the modes has been reached. The welding control can be either open-loop or closed-loop, where the open-loop process provides the mode thresholds and once one or more of those thresholds is reached the welding process is terminated. The closed-loop control provides feedback of the weld energy and/or the compression displacement so that the weld power and/or weld pressure can be increased or decreased accordingly.

20 Claims, 1 Drawing Sheet

MULTI-MODE ULTRASONIC WELDING CONTROL AND OPTIMIZATION

GOVERNMENT CONTRACT

This invention was made with U.S. Government support under Contract No. DE-EE0002217 awarded by the Department of Energy. The Government has certain rights in this invention.

BACKGROUND OF THE INVENTION

1. Field of the Invention

This invention relates generally to a system and method for controlling an ultrasonic welding process and, more particularly, to a system and method for multi-mode control of an ultrasonic welding process, where the modes include weld energy, weld time and part compression displacement.

2. Discussion of the Related Art

Electric vehicles are becoming more and more prevalent. These vehicles include hybrid vehicles, such as the extended range electric vehicles (EREV) that combine a battery and a main power source, such as an internal combustion engine, fuel cell system, etc., and electric only vehicles, such as the battery electric vehicles (BEV). All of these types of electric vehicles employ a high voltage battery that includes a number of battery cells. The batteries can be different battery types, such as lithium-ion, nickel metal hydride, lead acid, etc. Different vehicle designs include different battery designs that employ various trade-offs and advantages for a particular application.

A modern electric vehicle battery pack typically includes a plurality of battery modules, where each module includes a plurality of battery cells, and where the number of modules and cells determines the battery pack voltage. In one particular battery pack design, common polarity electrical tabs of three battery cells (tri-pack) are welded together and to an interconnect bus bar. Several of the tri-pack of battery cells are welded to the same interconnect bus bar within a single cell module, so that the cells in each tri-pack of battery cells are electrically coupled in parallel and the several tri-pack of battery cells are electrically connected in series within the module. A group of modules is electrically connected in parallel or series to form a battery section and a number of battery sections are electrically coupled together in a single housing to provide a battery pack.

Ultrasonic or vibrational welding using ultrasonic frequencies is known in the art. A horn or sonotrode of a vibrational welding machine is placed against the parts being welding and ultrasonic sound energy from a transducer causes the parts to vibrate, which creates friction that generates a large amount of heat to bond the parts together. In one specific application, vibrational welding is used to bond the common positive and common negative tabs of the tri-pack of battery cells to the interconnect bus bar referred to above.

The welding control strategy for vibrational welding for at least this application uses a single mode control from the several control parameters that are available. For example, the known single mode control for this process generally only monitors and controls one of welding energy, welding time or compression displacement distance of the tabs being welded relative to the interconnect bus bar. Particularly, the control strategy of the welding process may control or terminate the welding process based on only the amount of energy provided at the weld, which increases through time based on a power input to the ultrasonic horn. Alternately, the welding control strategy may control the welding process only by the duration of the welding time. Or, the welding process may be controlled by only the compression displacement of the parts being welded during the welding process.

Each one of these single mode welding control strategies has proven to be an applicable technique for providing the desired weld integrity for a particular application. However, using single mode welding control has been shown to cause random low probability weld integrity issues.

SUMMARY OF THE INVENTION

In accordance with the teachings of the present invention, a system and method are disclosed for providing multi-mode control of an ultrasonic or vibrational welding system. In one embodiment, the control modes include the energy of the weld, the time of the welding process and the compression displacement of the parts being welded during the welding process. The method includes providing thresholds for all of the modes, and terminating the welding process only after the threshold for each mode has been reached, the threshold for more than one mode has been reached or the threshold for one of the modes has been reached. The welding control can be either open-loop or closed-loop, where the closed-loop control provides feedback of the weld energy and/or the compression displacement so that the weld power, weld amplitude and/or weld pressure can be increased or decreased accordingly.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing multi-mode control of a welding process is merely exemplary in nature, and is in no way intended to limit the invention or its applications or uses. For example, the present invention is described as having particular application for welding battery tabs to an interconnect bus bar for a vehicle battery. However, as will be appreciated by those skilled in the art, the multi-mode welding control process described herein may have application for any ultrasonic or vibrational welding process for welding any suitable parts together.

Figure 1:
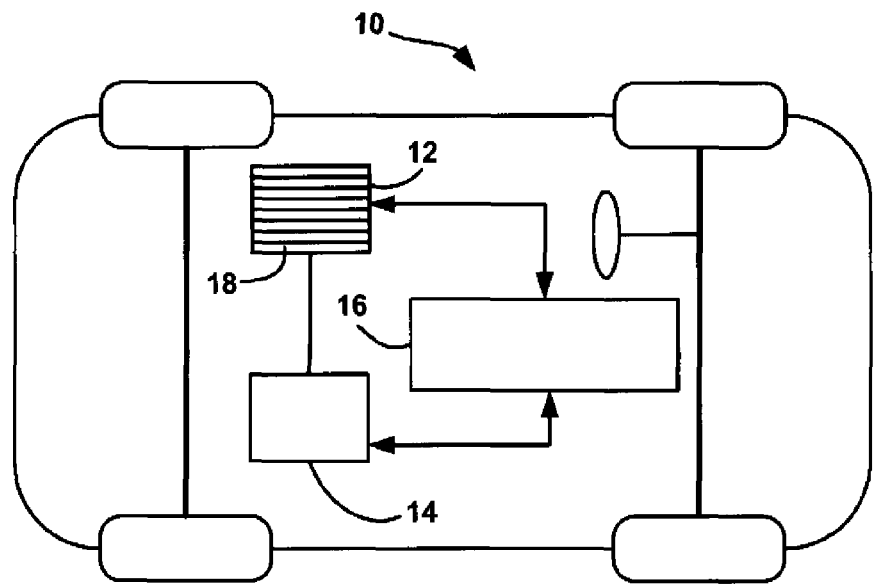
FIG. 1 is a top view of a conventional vehicle including a battery and a main power source.

FIG. 1 is a top view of a conventional vehicle 10 intended to represent an electric vehicle or an electric hybrid vehicle. The vehicle 10 includes a high voltage battery 12 including a plurality of battery cells 18. The battery 12 can be any battery suitable for an electric vehicle, such as a lead-acid battery, lithium-ion battery, nickel metal hydride battery, etc. The vehicle 10 may also include a separate power source 14, such as an internal combustion engine, fuel cell system, etc. A controller 16 controls the operation of the battery 12 and the power source 14 including the power distribution therebetween.

Figure 2:
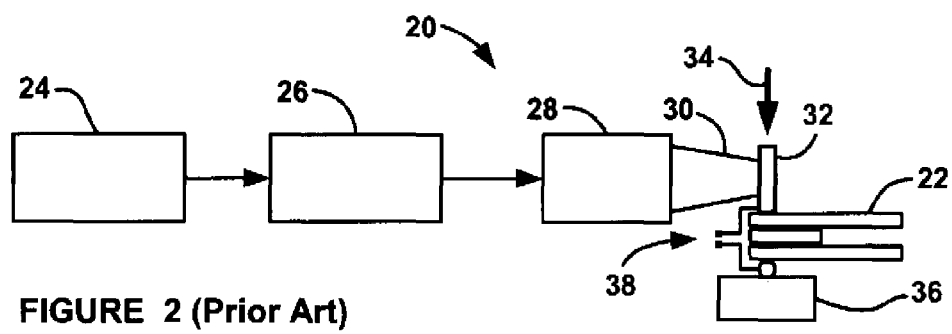
FIG. 2 is a schematic view of a conventional vibrational welding system for welding parts together.

FIG. 2 is a schematic view of a conventional ultrasonic or vibrational welding system 20 for welding or bonding a plurality of parts 22 together. In this non-limiting example, the parts 22 are three common battery terminal tabs for a battery cell of a vehicle battery, such as the battery 12. The system 20 includes a controller 24 that controls a power supply 26 that provides an electrical power signal to a transducer 28 that converts the electrical signal to a mechanical signal. The electrical signal is a frequency signal including a desirable frequency and amplitude for the particular application. A horn 30 is mechanically coupled to the transducer 28 and has a horn head 32 that is in contact with the parts 22. The mechanical energy causes the horn 30 to vibrate at the particular frequency, which causes the horn 30 to create friction on the parts 22 that causes significant heat to bond the parts 22 in a manner that is well understood in the art. A pressure 34 is applied to the horn head 32 towards the parts 22 to hold the parts 22 against an anvil 36, so that the combination of the pressure on the parts 22 and the ultrasonic energy provides the bonding. The system 20 also includes a displacement measuring device 38 that measures the compression displacement of the parts 22 during the bonding process as a result of the parts 22 becoming malleable and plasticized from the heat. In this embodiment, the displacement device 38 measures the distance between the horn head 32 and the anvil 36. However, many types of displacement techniques are known in the art that are suitable for this purpose.

As discussed above, the known vibrational welding systems employ single mode control to determine when to terminate the welding process. The present invention proposes a multi-mode control where, in one non-limiting embodiment, three modes, namely, weld energy, weld time and weld compression displacement, are used in combination to control when to terminate the welding process. However, other modes or combinations of modes can also be used to determine when to terminate the welding process within the spirit and scope of the present invention. Further, the multi-mode control can be either open-loop control or closed-loop control, as will be discussed in detail below.

The welding control strategy terminates the welding process when thresholds for one or more of the parameters of weld energy, weld time and weld compression displacement have been met. For example, it may be desirable to terminate the welding process when the weld energy reaches a predetermined energy value, such as 2000 Joules. Further, it may be desirable to terminate the welding process when the weld time reaches a predetermined weld time, such as one second. Also, it may be desirable to terminate the welding process when the compression displacement of the parts 22 reaches a predetermined displacement value, such as 200 μm. The present invention combines all of these modes into a control strategy to terminate the welding process if all three of the parameters have been met, a combination of two or more of the parameters has been met, or a single one of the parameters has been met. If the welding process is terminated when only one of the mode thresholds has been reached under the multi-mode control of the invention, this is still a control difference from the known single mode control because more than one parameter is being monitored during the multi-mode control, and the multi-mode control allows the welding process to be selectively terminated if the mode threshold for any one of more than one mode has been reached. In other words, the multi-mode control can selectively terminate the welding process if different ones of the mode thresholds have been met from one welding process to another.

For safety purposes, or otherwise, each parameter or mode has an upper control limit (UCL) where if the particular control parameter reaches the UCL threshold of any of the modes, then the welding process is terminated regardless of whether all or some of the desired thresholds have been met.

As is known in the art, welding systems of the type shown in FIG. 2 calculate the weld energy, typically in Joules as power integrated over time, during the welding process. For example, the controller 24 will determine, and display, the weld energy based on the output power provided by the power supply 26 and the type and size of the horn 30, where the weld energy provided to the parts 22 will increase as the welding process proceeds until it reaches a particular set value. Further, the controller 24 will monitor the time that the power supply 26 is providing the power signal to the transducer 28. Also, the controller 24 can receive an output signal from the device 38 indicating the compression displacement of the parts 22 during the welding process. Therefore, for the open-loop control, the controller 24 controls the power supply 26 so that it continues to provide power for the welding process until all three of the mode thresholds have been met, a combination of one or more of the modes has been met, or a UCL threshold for one of the modes has been reached, at which time the welding process is terminated.

In the closed-loop control, the energy rate and/or the compression displacement rate are monitored during the welding process to provide feedback, where the power signal to the transducer 28 and/or the pressure 34 can be increased or decreased accordingly if a desired rate is not being met. The weld energy changes in response to changes in the signal to the transducer 28 and the pressure 34 applied to the parts 22, where the power signal controls the acoustic power and/or the acoustic amplitude. Likewise, the compression displacement changes in response to changes in the power signal to the transducer 28 and the pressure 34 applied to the parts 22. The controller 24 monitors the rate at which the welding energy of the welding process is increasing and the rate at which the parts 22 are being compressed during the welding process, and increases or decreases the weld power signal and/or the pressure 34 applied to the parts 22 to control the welding energy rate and the rate of compression.

For example, in one non-limiting embodiment, the controller 24 monitors the energy rate $\dot{E}$ at which the weld energy E is increasing during the welding process where:

$$\dot{E} = \frac{E - E_{LCL}}{t - t_{LCL}},$$

and where LCL is a lower control limit, t is time and $t_{LCL}$ is the weld time associated with $E_{LCL}$, and when $t > t_{LCL}$.

If the energy rate $\dot{E}$ does not equal a desired energy rate $E_{rate}$, where:

$$E_{rate} = \frac{E_{UCL} - E_{LCL}}{t_{UCL} - t_{LCL}},$$

then the weld power signal and/or the pressure 34 is increased or decreased during the welding process some predetermined percentage until the energy rates $\dot{E}$ and $E_{rate}$ are equal.

Likewise, in one non-limiting embodiment, the compression displacement rate dḢ at which the parts 22 are being compressed during the welding process is monitored, where:

$$d\dot{H} = \frac{dH - dH_{LCL}}{t - t_{LCL}},$$

and where dH is the compression displacement at a particular point in time t during the welding process, $t_{LCL}$ is the weld time associated with $dH_{LCL}$, and when $t>t_{LCL}$.

If the compression displacement rate dḢ does not equal a desired displacement rate $dH_{rate}$, where:

$$dH_{rate} = \frac{dH_{UCL} - dH_{LCL}}{t_{UCL} - t_{LCL}},$$

then the weld power signal and/or the pressure 34 is increased or decreased during the welding process some predetermined percentage until the compression rates dḢ and $dH_{rate}$ are equal. As above, once all or some of the mode thresholds have been met, or a mode upper control limit has been reached, the welding process is stopped.

Figure 3:
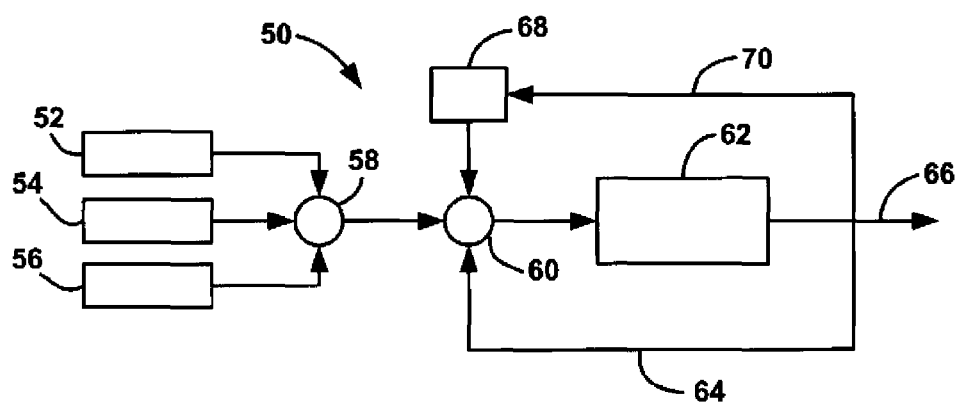
FIG. 3 is a block diagram of a multi-mode welding control strategy for controlling the welding process of the welding system shown in FIG. 2.

FIG. 3 is a block diagram 50 of a closed-loop multi-mode control algorithm of the type discussed above. At box 52, a control mode threshold value is provided for the energy mode, such as 2000 Joules, at box 54 a control mode threshold value is provided for the duration mode, such as one second, and at box 56 a control mode threshold value is provided for the compression displacement threshold, such as 200 μm. All three of these control threshold values are combined or ANDed together at logic gate 58 and provided to a comparator 60. The combined threshold values from the comparator 60 are provided to an ultrasonic welding control at box 62, which provides the welding control signals on an output line 66. The weld energy is fed back to the comparator 60 on line 64 and the compression displacement is fed back to box 68 on line 70 that controls the pressure 34, which provides a signal to the comparator 60 of the pressure change, if necessary. Thus, if the rate of the weld energy and/or the rate of the compression displacement are not the desired rates, as discussed above, then the power signal and/or the pressure 34 can be corrected up or down so that the error therebetween at the output of the summation junction 60 is at or near zero.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing multi-mode control of a vibrational welding process for welding a plurality of parts together, said method comprising:
determining a desirable welding energy value for welding the parts together;
determining a desirable time value for a duration of the welding process for welding the parts together;
determining a desirable compression displacement value for a desired compression of the parts when they are welded together;
initiating the welding process for welding the plurality of parts;
monitoring actual values of welding energy, time and compression displacement during the welding process; and
terminating the welding process when one or more of the desirable welding energy value, the desirable time value and the desirable displacement value has been reached by the actual value.

2. The method according to claim 1 wherein terminating the welding process includes terminating the welding process when all of the desirable welding energy value, the desirable time value and the desirable displacement value have been reached.

3. The method according to claim 1 wherein terminating the welding process includes terminating the welding process when more than one of the desirable welding energy value, the desirable time value and the desirable displacement value has been reached.

4. The method according to claim 1 wherein terminating the welding process includes terminating the welding process when one of the desirable welding energy value, the desirable time value and the desirable displacement value has been reached.

5. The method according to claim 1 further comprising monitoring a rate at which the welding energy of the welding process is increasing during the welding process and increasing or decreasing a welding power signal that controls weld power and/or a pressure applied to the parts if the energy rate is not the same as a desired welding energy rate.

6. The method according to claim 1 further comprising monitoring a rate at which the parts are being compressed during the welding process and increasing or decreasing a welding power signal that controls weld power and/or a pressure applied to the parts if the rate of compression is not the same as a desired rate of compression.

7. The method according to claim 1 wherein terminating the welding process includes terminating the welding process if an upper control limit of the welding energy, the welding time or the compression displacement has been reached regardless of whether all of the desirable welding energy value, the desirable time value and the desirable compression displacement value have been reached.

8. The method according to claim 1 wherein the parts are battery terminals.

9. A method for providing multi-mode control of a vibrational welding process for welding a plurality of parts together, said method comprising:
determining a plurality of desirable mode values that are each parameters used for determining welding duration for welding the parts together where each mode value is different than the other mode values;
initiating the welding process for welding the plurality of parts;
monitoring actual values of parameters of the welding process associated with the plurality of desirable mode values; and
terminating the welding process when one or more of the mode values has been reached by the actual value.

10. The method according to claim 9 wherein one of the plurality of mode values is a desirable welding energy value for welding the parts together.

11. The method according to claim 10 further comprising monitoring a rate at which the welding energy of the welding process is increasing during the welding process and increasing or decreasing a welding power signal that controls weld power and/or a pressure applied to the parts if the energy rate is not the same as a desired welding energy rate.

12. The method according to claim 9 wherein one of the plurality of mode values is a desirable time value for a duration of the welding process for welding the parts together.

13. The method according to claim 9 wherein one of the plurality of mode values is a desirable compression displacement value for a desired compression of the parts when they are welded together.

14. The method according to claim 13 further comprising monitoring a rate at which the parts are being compressed during the welding process and increasing or decreasing a welding power signal that controls weld power and/or a pressure applied to the parts if the rate of compression is not the same as a desired rate of compression.

15. The method according to claim 9 wherein terminating the welding process includes terminating the welding process if an upper control limit of any of the plurality of mode values is reached regardless of whether any of the other mode values has been reached.

16. The method according to claim 9 wherein the parts are battery terminals.

17. A system for providing multi-mode control of a vibrational welding process for welding a plurality of parts together, said system comprising:
 a memory module for storing a desirable welding energy value for welding the parts together, a desirable time value for a duration of the welding process for welding the parts together and a desirable compression displacement value for a desired compression of the parts when they are welded together;
 a displacement measuring device for measuring an actual compression of the parts being welded;
 a comparator for comparing an actual welding energy value to the desirable welding energy value, comparing an actual time value to the desirable time value, and comparing the actual compression of the parts to the desirable compression displacement value; and
 a controller configured to provide a welding control signal to a vibrational welding device based on signals from the comparator, where the controller terminates the welding process when one or more of the desirable welding energy value, the desirable time value and the desirable compression displacement value has been reached by the actual value.

18. The system of claim 17 wherein the controller is further configured to monitor a rate at which the welding energy of the welding process is increasing during the welding process and modify the welding control signal and/or a pressure applied to the parts if the energy rate is not the same as a desired welding energy rate.

19. The system of claim 17 wherein the controller is further configured to monitor a rate at which the parts are being compressed during the welding process and modify the welding control signal and/or a pressure applied to the parts if the rate of compression is not the same as a desired rate of compression.

20. The system of claim 17 wherein the controller terminates the welding process if an upper control limit of the welding energy, the welding time or the compression displacement has been reached regardless of whether all of the desired welding energy value, the time value and the welding compression displacement value have been reached.

* * * * *